(No Model.) 2 Sheets—Sheet 1.
S. L. WORSLEY.
WIRE FEEDING MECHANISM.
No. 320,523. Patented June 23, 1885.
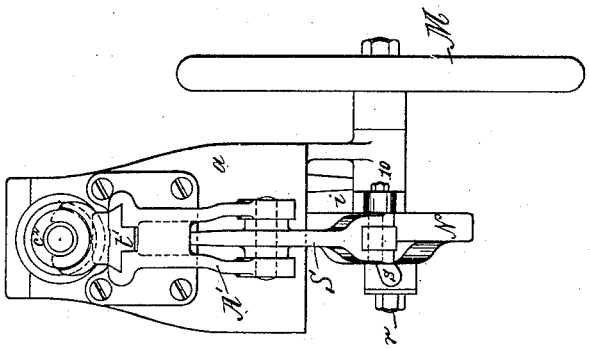
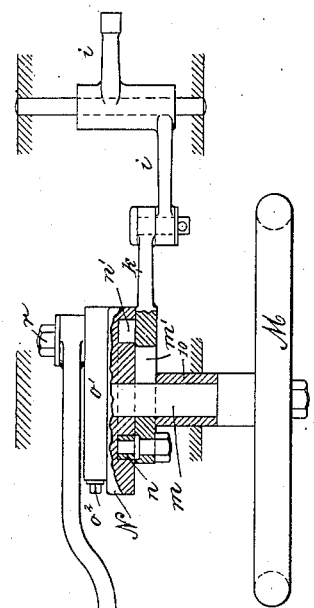
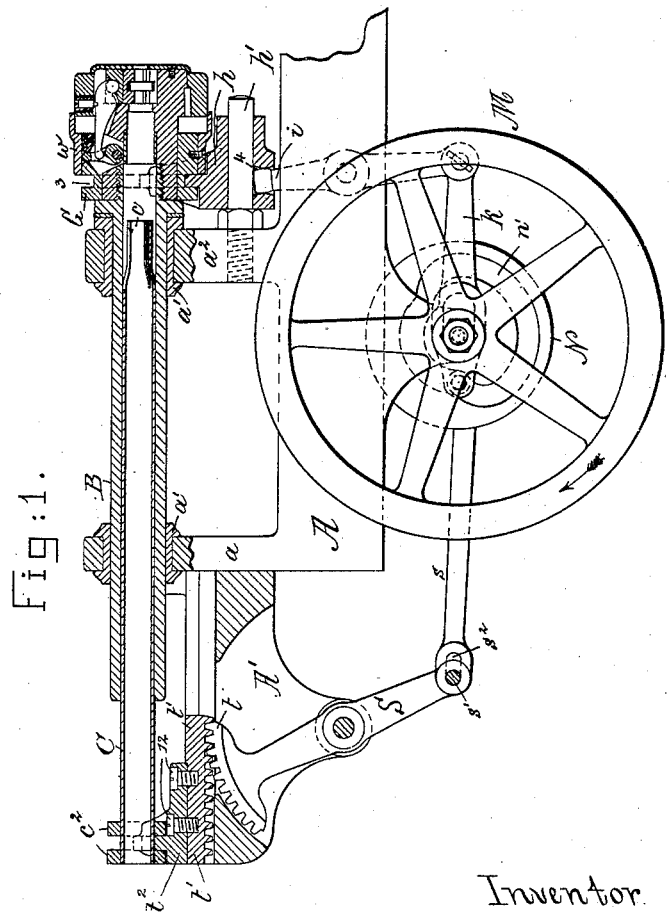
Witnesses.
Arthur Lippistein
Howard Greene
Inventor.
Samuel L. Worsley
by Crosby & Gregory.
Attorneys (No Model.) 2 Sheets—Sheet 2.
S. L. WORSLEY.
WIRE FEEDING MECHANISM.
No. 320,523. Patented June 23, 1885.
Fig: 4.
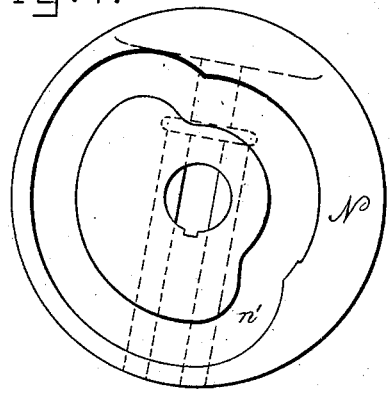
Fig: 5.
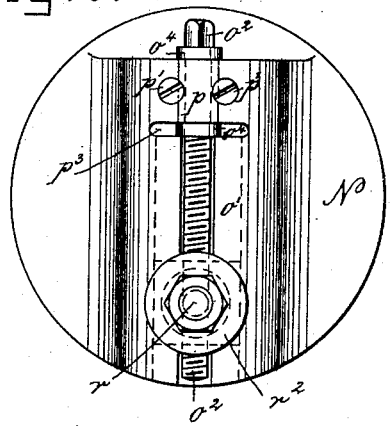
Fig: 6.
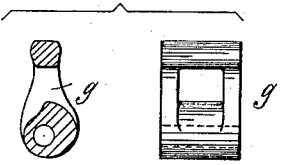
Fig: 7.
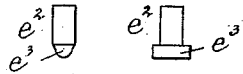
Fig: 8.
Fig: 9.
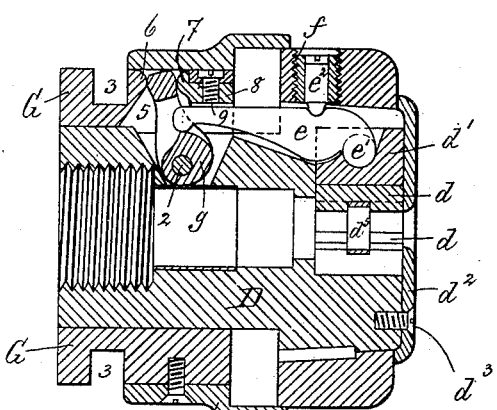
Fig: 10.
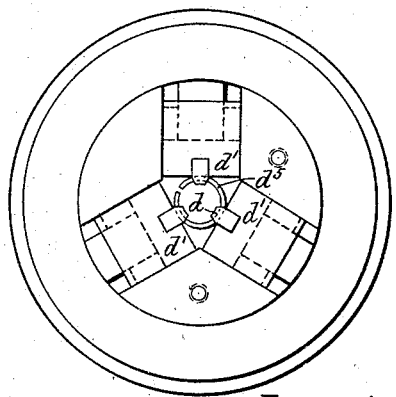
Witnesses.
Arthur Zipperlen
Howard Greene
Inventor.
Samuel L. Worsley
by Crosby & Gregory
Attorneys

UNITED STATES PATENT OFFICE.

SAMUEL L. WORSLEY, OF TAUNTON, MASS., ASSIGNOR TO THE BROWN & SHARPE MANUFACTURING COMPANY, OF PROVIDENCE, R. I.

WIRE-FEEDING MECHANISM.

SPECIFICATION forming part of Letters Patent No. 320,523, dated June 23, 1885.

Application filed April 10, 1885. (No model.)

*To all whom it may concern:*

Be it known that I, SAMUEL L. WORSLEY, a citizen of the United States, residing in Taunton, in the county of Bristol and State of Massachusetts, have invented an Improvement in Wire-Feeding Mechanisms and Chucks, of which the following description, in connection with the accompanying drawings, is a specification, like letters on the drawings representing like parts.

This invention is an improvement in wire-feeding mechanism, and chucks for feeding wire in screw and other machines.

Heretofore in wire-feeding mechanism and chucks for feeding wire in machines, more especially in screw-machines, the wire has been fed to stop or other device specially employed to limit the feed of the wire, said stop having been located in the turret. In such feeding mechanism it is required to feed the wire a greater length than is actually needed, so as to positively bring the end of the wire against the stop in the turret, and in so doing the feeding mechanism is caused to slip or move on the wire to the extent of such excess of feed. This results in considerable wear of parts, and makes the stop in the turret an essential feature of such machines. Further, the turret is required to be moved forward and back, and then partially rotated, to bring, first, the stop into required relation with the chuck, and, second, the first tool into position to act on the wire. It is desirable that the turret be furnished with a number of tools, and oftentimes it is found that it cannot carry as many as are required in certain classes of work. In such machines the stop is as important an element and occupies as much space in the turret as any one of the tools employed therewith, as well as requiring as much time and as many movements in its adjustment.

The object of this my invention is to dispense with all stop mechanism whatever, to permit the turret to carry more tools, and to enable the wire to be fed positively the desired length, and, further, to provide for adjustment of the feed mechanism, so as to readily obtain increased or diminished feed of the wire.

To these ends my invention consists, primarily, of a chuck, and a chuck opening and closing mechanism, and a wire-feeding tube independent of the chuck, and tube-operating mechanism, combined with a cammed disk having a wrist-pin operatively connected therewith, and intermediate mechanism connecting the disk with the chuck and tube operating mechanisms, whereby, through the action of said disk, the chuck is opened and closed, and the wire-feeding tube carried forward and back to feed the wire.

My invention further consists of a wire-feeding tube and tube-operating mechanism, combined with a cam provided with an adjustable stud or wrist-pin and a rod connecting the stud or wrist-pin with the tube-operating mechanism, whereby motion of the cam is conveyed to the wire-feeding tube to obtain greater or less reciprocating movement thereof, and thereby secure a longer or shorter feed of the wire.

My invention further consists of certain details of construction, which are fully set forth in the following description, and are particularly pointed out in the claims.

Figure 1 is a side elevation, partly in longitudinal vertical section, of a portion of a wire-feeding mechanism and chuck sufficient to illustrate my invention; Fig. 2, a top view of the cam and its operative parts, partly in section, the lever $i$, to be referred to, with its shaft or journal, being removed from its proper position (shown in Fig. 1) to more fully illustrate the same; Fig. 3, a rear end view. Figs. 4, 5, and 7 are details of the disk or cam; Fig. 6, details of the lever-operating cams of the chuck. Fig. 8 shows in front and side elevation the pivot for the levers which operate the jaws of the chuck; Fig. 9, a longitudinal vertical section of the chuck, and Fig. 10 a front view of the chuck with the end plate removed.

The bed A, standards $a$ $a^2$, bearings $a'$, hollow spindle B, and the wire-feeding tube C, having the bifurcated or spring jaws $c$, and supported by the spindle, are and may be of usual or preferred construction.

The wire is passed into the tube C, and through the spring-jaws thereof, and through the jaws $d$ of the chuck D, which is secured to the forward end of the spindle B. The jaws $d$ are retained in sockets in the jaw-holders $d'$, which are capable of movement in the body of the chuck at right angles to the wire, so that the faces of said jaws are always maintained in lines parallel with the longitudinal axis or line of movement of the wire, whereby when said jaws are caused to grip the wire the latter will be rigidly held the whole length of the jaws. The jaw-holders $d'$ are kept in the sockets provided for them in the body of the chuck by means of the end plate, $d^2$, attached by screws $d^3$ to the front of the chuck, so that said jaw-holders have a positive movement in the chuck, whether moved toward or from the bore thereof. The jaws are opened or moved from one another by the action of the spring $d^5$, which rests in mortises in said jaws and below the faces of same, as shown in Figs. 9 and 10. On the other hand the jaws are brought nearer together to grip the wire through the levers $e$, (see Figs. 1 and 9,) having socket-bearings $e'$ in the jaw-holders $d'$, while they are fulcrumed or have their axes of movement on the pivots $e^2$ of the hollow set-screws $f$, which may be adjusted to limit the movement of the jaw-holders and attached jaws, to increase or diminish the grip or holding-power of said jaws, and also to enable them to be "trued" without being removed from the chuck.

The faces $e^3$ (see Fig. 8) of the pivots $e^2$ are of greater width than the diameter of the shank portion which enters the screw $f$, the purpose of which is to give greater bearing-surface for the levers to steady same, and at the same time to bear against the bottom of the screw $f$, to provide the necessary strength of parts, and transfer the strain from the head of the screw to the body thereof when screwed into the chuck D.

The rear or free ends of the levers $e$ project into the cams $g$, which are pivoted to the chuck-body by the pins 2, and extend outward therefrom to enter recesses in the sleeve G, between the bearing-points 6 and 7, the latter point forming part of a removable plug, 8, which is retained in said sleeve by a set-screw passing through a portion of the sleeve and entering the plug, as clearly shown in Fig. 9.

The sleeve G slides on the chuck-body, and is operated by means of the forked block $h$, entering the groove 3 of said sleeve and sliding on the stud $h'$, secured in the standard $a^2$, the said block being in turn operated by the lever $i$, pivoted to the bed A, one end of said lever being mortised at 4 in the forked block, while the other end is attached to the connecting slide-rod $k$. This slide-rod has an opening, $m'$, (shown in Fig. 2, and in dotted lines, Fig. 1,) which permits it to encircle or slide on the hub of the hanger 10, that supports the stud $m$ of the hand-wheel M and disk or cam N, the end of the said connecting-rod receiving a roll, $n$, working in the cam-groove $n'$ in one side or face of the cam N. The other face of the cam is provided with a slide-block, $o$, (see Fig. 7,) adapted to be moved in the ways $o'$, and working on the adjusting-screw $o^2$, which is free to be rotated in said ways, but is prevented from longitudinal movement therein by means of the collars $o^4$, formed thereon, and abutting portions of the ways, the said adjusting-screw being retained in place by the cup-piece $p$ and screws $p'$, as shown in Fig. 5.

An abutting-surface is provided in the ways for one of the collars $o^4$ by means of the slot $p^3$.

The slide-block $o$ has a screw-stud, $r$, a sleeve, $r'$, and washer $r^2$, which forms a wrist-pin to receive one end of a connecting-rod, $s$, whose other end is loosely connected by the slot $s'$ and pin $s^2$ with a segment-lever, S, pivoted to an extension, A', of the bed A, and having the toothed segment $t$. This segment engages a rack-bar, $t'$, sliding in the extension A', as shown, and having a forked block, $t^2$, fastened thereto with screws 12, said forked block projecting between and engaging the collars $c^2$ on the rear end of the wire-feeding tube C, so that upon motion of the segment-lever S, induced by the cam N, the rack-bar is reciprocated in the extension A', and the tube C moved in the spindle B toward or from the chuck. Upon turning the adjusting-screw $o^2$ of the disk N the block $o$ will be moved toward or from the axis of the disk, so as to increase or diminish its throw, and thereby obtain greater or less reciprocating movement of the tube C, to feed the wire in longer or shorter lengths, as desired. After the screw $o^2$ has been adjusted, the screw-stud $r$ is tightened to bind the sleeve $r'$ against the face of the ways $o'$, to more securely hold the parts in adjusted position.

The outside sleeve, $w$, of the chuck incloses and protects the jaw-operating mechanism from injury, dust, &c.

In Fig. 1 of the drawings, the chuck mechanism is shown in the position when the jaws grasp the wire, while the wire-feeding tube C is in withdrawn or retracted position. Upon turning the hand-wheel M in the direction of the arrow the forked block $h$, through the action of the cam-groove $n'$ of the cam N, the connecting-rod $k$, and lever $i$, will move the sleeve G forward on the body of the chuck, thereby throwing the pivoted cams $g$ forward, when the levers $e$ can be moved on the pivots $e^2$, and the jaws forced apart to release the wire by the action of the spring $d^5$. In the meantime—that is to say, while the jaws are being withdrawn from the wire to release same—the action of the double cam is not exerted on the segment-lever S, but is spent or lost at the loose connection between said lever and the rod $s$. As soon as the wire is fully released by the chuck, the disk $n$ begins to act on the segment-lever to cause the wire-feeding tube to be moved forward toward the chuck, and thereby feed a given length of wire through the latter, the spring-jaws $c$ of the tube grasping the wire with sufficient force for that purpose. The completion of one rotation of the hand-wheel causes the chuck to again grasp the wire, and the tube C to slip over said wire and be returned to its former position.

What I claim is—

1. The combination, with a chuck and chuck opening and closing mechanism, and a wire-feeding tube and tube-operating mechanism, of a cam having a wrist-pin operatively connected therewith, and rods connecting the cam with the chuck opening and closing mechanism, and the wrist-pin with the tube-operating mechanism, as and for the purpose described.

2. The combination, with a chuck and chuck opening and closing mechanism, and a wire-feeding tube and tube-operating mechanism, of a cam provided with a wrist-pin adapted to be moved toward or from the axis of the cam, and rods for connecting the chuck opening and closing mechanism with one part of the cam, and the tube-operating mechanism with the wrist-pin, as and for the purpose set forth.

3. In wire-feeding mechanism, a wire-feeding tube and tube-operating mechanism, combined with a cam provided with an adjustable wrist-pin, adapted to be moved toward or from the axis of the cam, and means for connecting the wrist-pin with the tube-operating mechanism, for the purpose specified.

4. The combination, with a chuck and chuck opening and closing mechanism, and a wire-feeding tube and tube-operating mechanism, of a cam having a wrist-pin operatively connected therewith, means for positively connecting the chuck opening and closing mechanism with the cam, and a rod attached to the wrist-pin and loosely connected with the tube-operating mechanism, to permit lost motion between said cam and the tube-operating mechanism, as set forth.

5. The combination, in a chuck, of a chuck-body provided with a sleeve and with movable jaw-holders having jaws, of cams $g$, pivoted to the chuck-body and extending into the sleeve, and jaw-operating levers, the ends of which engage the jaw-holders and cams, and having their fulcra between said ends, as and for the purpose described.

6. The combination, with the jaw-holders having jaws and the jaw-operating levers, of the hollow screws $f$, provided with pivots, for the purposes specified.

7. The combination, with a wire-feeding tube and tube-operating mechanism, of a cam provided with a slide-block having attached stud, and an adjusting-screw to move the slide-block toward or from the axis of the cam, and a rod connecting the stud with the tube-operating mechanism, substantially as set forth.

8. The combination, with a cam-wheel and a wire-feeding tube, of a slide engaging the tube and provided with a rack-bar, a lever having a toothed segment, and a rod connecting the lever with the cam-wheel, for the purpose specified.

In testimony whereof I have signed my name to this specification in the presence of two subscribing witnesses.

SAMUEL L. WORSLEY.

Witnesses:
HOWARD GREENE,
JAS. H. LANGE.